United States Patent [19]

Ochi et al.

[11] Patent Number: 5,705,124
[45] Date of Patent: Jan. 6, 1998

[54] HIGH CARBON BEARING STEEL HAVING A LONG LIFE

[75] Inventors: Tatsuro Ochi; Yuji Kawauchi, both of Muroran, Japan

[73] Assignee: Nippon Steel Corporation, Tokyo, Japan

[21] Appl. No.: 591,451

[22] PCT Filed: Jun. 16, 1995

[86] PCT No.: PCT/JP95/01208

§ 371 Date: Jan. 31, 1996

§ 102(e) Date: Jan. 31, 1996

[87] PCT Pub. No.: WO95/34692

PCT Pub. Date: Dec. 21, 1995

[30] Foreign Application Priority Data

Jun. 16, 1994 [JP] Japan .................... 6-134535

[51] Int. Cl.$^6$ .................... C22C 38/22; C22C 38/44
[52] U.S. Cl. .................... 420/105; 420/110; 420/111; 148/906; 148/334
[58] Field of Search .................... 420/109, 110, 420/111, 105, 101; 148/334, 335, 906

[56] References Cited

U.S. PATENT DOCUMENTS

| 4,581,079 | 4/1986 | Borik . |
| 5,268,141 | 12/1993 | Ototani et al. .................... 420/8 |

FOREIGN PATENT DOCUMENTS

| 48-71714 | 9/1973 | Japan . |
| 1-306542 | 2/1989 | Japan . |
| A-3-64430 | 3/1991 | Japan . |
| 4-198417 | 7/1992 | Japan . |
| 5-51693 | 3/1993 | Japan . |
| 5-255809 | 10/1993 | Japan . |
| 5-331598 | 12/1993 | Japan . |
| 6-10097 | 1/1994 | Japan . |
| A-7-54103 | 2/1995 | Japan . |
| A-2155951 | 10/1985 | United Kingdom . |

OTHER PUBLICATIONS

Patent Abstracts of Japan, vol. 14, No. 100 (C–693), Feb. 23, 1990 & JP–A–306542 (Sanyo Special Steel Co., Ltd.), Dec. 11, 1989.

Patent Abstracts of Japan, vol. 18, No. 215 (C–1191), Apr. 18, 1994 & JP–A–06010097 (Sumitomo Metal Ind.), Jan. 18, 1994.

Patent Abstracts of Japan, vol. 18, No. 030 (C–1153), Jan. 17, 1994 & JP–A–05 255809 (Aichi Steel Works Ltd.), Oct. 5, 1993.

Patent Abstracts of Japan, vol. 17, No. 361 (C–1080), Jul. 8, 1993 & JP–A–05 051693 (Sumitomo Metal Ind. Ltd.), Mar. 2, 1993.

Development of a Bearing Steel Having Ultra High Purification (EP Steel), Bulletin of Japan Institute of Metals, vol. 32, No. 6, pp. 441–443 (1993).

*Primary Examiner*—Deborah Yee
*Attorney, Agent, or Firm*—Kenyon & Kenyon

[57] ABSTRACT

The present invention is intended to provide a high carbon bearing steel, for bearing parts, excellent in rolling fatigue characteristics. A high carbon bearing steel having a long life comprising 0.70 to 1.20% of C, 0.15 to 1.70% of Si, 0.15 to 1.20% of Mn, 0.50 to 2.00% of Cr, 0.05 to 1.50% of Mo, 0.001 to 0.03% of S, 0.010 to 0.05% of Al, 0.003 to 0.015% of N, 0.0005 to 0.0300% of total Mg, up to 0.025% of P, up to 0.0040% of Ti, up to 0.0015% of total oxygen, one or at least two elements selected from V, Nb and Ni in specific amounts, and having a number ratio of Mg oxides contained therein of at least 0.8.

4 Claims, No Drawings

HIGH CARBON BEARING STEEL HAVING A LONG LIFE

FIELD OF THE INVENTION

The present invention relates to a bearing steel and, particularly, to a high carbon bearing steel having a long life which is excellent in rolling fatigue characteristics when used, as bearing parts such as outer rings, inner rings, rollers and balls, under a high load.

BACKGROUND OF THE INVENTION

As automotive engines have been made to have a high power and to correspond to environmented regulations in recent years, bearing parts are also required to have an improved rolling fatigue life. Rolling fatigue failures of bearing parts are thought to start from oxide inclusions.

Accordingly, attempts to extend the life of a bearing steel have heretofore included lowering the oxygen content and enhancing the cleanliness of the steel. For example, The Japan Institute of Metals 32, No.6, 441–443 discloses that a combination of tapping from the bottom of an eccentric furnace, RH vacuum degassing, and the like procedure decreases the oxygen content of a bearing steel to 3 to 6 ppm, resulting in fewer large oxide inclusions and an improved rolling fatigue life. However, extending the life of the bearing steel by the procedures as mentioned above is not necessarily satisfactory particularly when the steel is used under a high load. On the other hand, Japanese Unexamined Patent Publication (Kokai) No. 3-644430 discloses that, in contrast to the improvement of the cleanliness of the steel by lowering the oxygen content as mentioned above, when the oxygen content in the steel is instead increased to from 0.002 to 0.005% to make the oxide inclusions an $Al_2O_3$—$SiO_2$—CaO (MnO) system, the steel exhibits an improved life.

However, even the bearing steel thus obtained does not necessarily exhibit a sufficiently extended life when used under a high load. As described above, the development of a longer-lived steel is strongly desired particularly when the bearing steel is to be used under a high load.

DISCLOSURE OF THE INVENTION

An object of the present invention is to provide a high carbon bearing steel for bearing parts, particularly for bearing parts which are used under a high load and which exhibit excellent rolling fatigue characteristics.

The subject matter of the present invention is as described below.

(1) A high carbon bearing steel having a long life which comprises, in terms of weight, 0.70 to 1.20% of C, 0.15 to 1.70% of Si, 0.15 to 1.20% of Mn, 0.50 to 2.00% of Cr, 0.05 to 1.50% of Mo, 0.001 to 0.03% of S, 0.010 to 0.05% of Al, 0.003 to 0.015% of N, 0.0005 to 0.0300% of total Mg, up to 0.025% of P, up to 0.0040% of Ti, up to 0.0015% of total oxygen and the balance Fe and unavoidable impurities.

(2) A high carbon bearing steel having a long life which comprises, in terms of weight, 0.70 to 1.20% of C, 0.15 to 1.70% of Si, 0.15 to 1.20% of Mn, 0.50 to 2.00% of Cr, 0.05 to 1.50% of Mo, 0.001 to 0.03% of S, 0.010 to 0.05% of Al, 0.003 to 0.015% of N, 0.0005 to 0.0300% of total Mg, one or at least two elements selected from the group consisting of the following elements in the following amounts: 0.03 to 0.7% of V, 0.005 to 0.3% of Nb and 0.10 to 2.00% of Ni, up to 0.025% of P, up to 0.0040% of Ti, up to 0.0015% of total oxygen and the balance Fe and unavoidable impurities.

(3) The high carbon bearing steel having a long life according to (1) or (2), wherein the number ratio of oxides contained therein satisfies the formula (number of $MgO.Al_2O_3$+number of MgO)/(number of total oxide inclusions)$\geq 0.80$

BEST MODE FOR CARRYING OUT THE INVENTION

In order to realize a high carbon bearing steel which can exhibit excellent rolling fatigue characteristics even under a high load, the present inventors have intensively carried out investigations, and have made the discovery described below.

(1) In rolling fatigue failure under a high load, a rolling fatigue failure starts from nonmetallic inclusion accompanying a white structure with a carbide structure on the periphery thereof. The white structure and the carbide structure involve hardness lowering. The formation of the white structure and the carbide structure is inhibited by making the nonmetallic inclusions fine.

(2) As described above, making nonmetallic inclusions fine is effective in extending the life of the steel. Making nonmetallic inclusions fine has the following two advantages: (i) reduction of stress concentration which has heretofore been believed to cause crack formation, and (ii) inhibition of the formation of the white structure and the carbide structure which have been newly found. Moreover, it becomes important to inhibit the formation of the white structures and the carbide structures on the periphery of nonmetallic inclusions in the process of rolling fatigue and prevent hardness lowering thereon.

(3) In order to make the nonmetallic inclusions fine, the addition of Mg in a proper amount, as proposed in Japanese Unexamined Patent Publication (Kokai) No. 7-54103 by the present inventors, is effective. The fundamental, concept of this method is as follows: Mg is added to a practical carbon steel containing Al, and the oxide composition is converted from $Al_2O_3$ to $MgO.Al_2O_3$ or MgO.; as a result the formation of oxide aggregates is prevented, and the oxide is dispersed in a fine form. Since $MgO.Al_2O_3$ or MgO has a low surface energy when in contact with molten steel, as compared with $Al_2O_3$, the nonmetallic inclusions do not easily become aggregates, and a fine dispersion thereof is achieved. As described above, making the nonmetallic inclusions fine has two advantages, namely the reduction of stress concentration causing crack formation, and the inhibition of the formation of the white structure and the carbide structure. The addition of Mg is, therefore, greatly effective in extending the life of the bearings mode of the steel.

(4) Next, the following procedures are effective in inhibiting the formation of the white structure and the carbide structure and preventing a reduction in hardness:

(i) adding Mo, and (ii) increasing the Si content.

(5) In addition to the procedures mentioned above, further additions according to the following procedures, increase the effects of inhibiting the formation of the white structure and the carbide structure and preventing hardness reduction:

(i) adding V and Nb, and
(ii) adding Ni.

The present invention is explained in detail below.

Reasons for restricting the range of the chemical composition of the steel of the present invention are explained below.

C:

Although C is an element effective in obtaining the rolling fatigue strength and the wear resistance necessary for bearing parts as final products, the effects are insufficient when the C content is less than 0.70%. Moreover, when the C content exceeds 1.20%, the amount of network primary cementite at grain boundaries becomes significant. As a result, the workability of the steel subsequent to spheroidization and the strength of the final products deteriorate. Accordingly, the C content is defined to be from 0.70 to 1.20%.

Si:

Si is added for the purpose of deoxidizing and extending the life of the final products by inhibiting the formation of the white structure and the carbide structure and by preventing hardness reduction in the process of rolling fatigue. However, the effects become insufficient when the Si content is less than 0.15%. On the other hand, when the content exceeds 1.70%, such effects are saturated, and the toughness of the final products is rather deteriorated. Accordingly, the Si content is defined to be from 0.15 to 1.70%.

Mn:

Mn is an element effective in extending the life of the final products through the improvement of the hardenability. However, the effects become insufficient when the Mn content is less than 0.15%. On the other hand, when the Mn content exceeds 1.2%, the effects are saturated, and the toughness of the final products is rather deteriorated. Accordingly, the Mn content is defined to be from 0.15 to 1.20%.

Cr:

Cr is an element effective in improving the hardenability to make the steel tough and improving the wear resistance through aiding the formation of carbides. The effects are insufficient when the Cr content is less than 0.5%. On the other hand, when the Cr content exceeds 2.0%, the effects are saturated, and the toughness of the final products is rather deteriorated. Accordingly, the Cr content is defined to be from 0.50 to 2.0%.

Mo:

Mo is added for the purpose of improving the hardenability and extending the life of the final products through inhibiting the formation of the white structure and the carbide structure in the process of rolling fatigue. However, the effects become insufficient when the Mo content is less than 0.05%. On the other hand, the effects are saturated, and the toughness of the final products is rather deteriorated, when the Mo content exceeds 1.5%. Accordingly, the Mo content is defined to be from 0.05 to 1.50%.

S:

S is present in the steel as MnS, and contributes to improve the machinability thereof and make the structure fine. However, when the S content is less than 0.001%, the effects are insufficient. On the other hand, the effects are saturated, and the rolling fatigue characteristics are rather deteriorated, when the S content exceeds 0.03%. For the reason as described above, the S content is defined to be from 0.001 to 0.03%.

Al:

Although Al is added as an element for deoxidation and grain refining, the effects become insufficient when the Al content is less than 0.010%. On the other hand, the effects are saturated, and the toughness is rather deteriorated when the Al content exceeds 0.05%. Accordingly, the Al content is defined to be from 0.010 to 0.05%.

N:

N contributes to make austenite grains fine through the precipitation behavior of AlN. However, the effects become insufficient when the N content is less than 0.003%. On the other hand, the effects are saturated, and the toughness is rather deteriorated, when the N content exceeds 0.015%. Accordingly, the N content is defined to be from 0.003 to 0.015%.

Total Mg:

Mg is a strong deoxidation element, and is added so that Mg reacts with $Al_2O_3$ in the steel to take O away therefrom to form $MgO.Al_2O_3$ or MgO. In order to achieve the reaction, Mg is required to be added in an amount at least to a certain level in accordance with the amount of $Al_2O_3$, namely the total amount of O in terms of percent by weight. Otherwise, unreacted $Al_2O_3$ would unpreferably remain. As the result of conducting experiments to ascertain the amount of Mg, it has been found that no unreacted $Al_2O_3$ remains and the oxide can be completely converted to $MgO.Al_2O_3$ or MgO when the total amount of Mg in terms of percent by weight is made to be at least 0.0005%. However, when Mg is added so that the total amount of Mg in terms of percent by weight exceeds 0.0300%, Mg carbide and Mg sulfide are formed, and the results are unpreferable with regard to the material properties. For reasons as described above, the Mg content is defined to be from 0.0005 to 0.0300%. In addition, the total Mg content is the sum of the soluble Mg content in the steel, the content of Mg in Mg oxide and the content of Mg in the other Mg compounds (unavoidably formed).

P:

P causes grain boundary segregation and center-line segregation in the steel, and deteriorates the strength of the final products. Since the strength deterioration becomes significant particularly when the content of P exceeds 0.025%, the content is restricted to up to 0.025%.

Ti:

Ti forms TiN as a hard precipitate, which triggers the formation of the white structure and the carbide structure, that is, it becomes the starting point of a rolling fatigue failure. Consequently, TiN causes the deterioration of the rolling fatigue life of the final products. Since the deterioration of the life becomes significant particularly when the Ti content exceeds 0.0040%, the content is defined to be up to 0.0040%.

Total O:

In the present invention, the total O content is the sum of the content of O dissolved in the steel and the content of O forming oxides (mainly alumina) in the steel. However, the total O content approximately agrees with the content of O forming the oxides. Accordingly, when the total O content is higher, the amount of $Al_2O_3$ in the steel to be reformed is greater. The limit of the total O content from which the effects of the present invention can be expected has been investigated. As a result, it has been found that when the total O content exceeds 0.0015% by weight, the amount of $Al_2O_3$ becomes excessive and as a result the total amount of $Al_2O_3$ in the steel cannot be converted to $MgO.Al_2O_3$ or MgO to leave alumina in the steel at the time of adding Mg. The total O content in the steel of the present invention is, therefore, restricted to up to 0.0015% by weight.

Next, the steel in the second aspect of the present invention may be made to contain one or at least two elements selected from V, Nb and Ni for the purpose of preventing hardness reduction and of inhibiting the formation of the white structure and the carbide structure in the process of rolling fatigue.

Nb, V

V and Nb are added to prevent hardness reduction in the process of rolling fatigue by precipitation hardening. However, when the addition content of V is less than 0.03% or when that of Nb is less than 0.005%, the effects are insufficient. On the other hand, when the content of V exceeds 0.7% or when that of Nb exceeds 0.3%, the effects are saturated, and the toughness is rather deteriorated. Accordingly, the content of V is defined to be from 0.03 to 0.7%, and that of Nb is defined to be from 0.01 to 0.3%.

Ni:

Ni is added for the purpose of improving the hardenability of the steel, and extending the life of the final products through inhibiting the formation of the white structures and the carbide structures in the process of rolling fatigue. However, when the Ni content is less than 0.10%, the effects are insufficient. On the other hand, when the Ni content exceeds 2.00%, the effects are saturated, and the addition thereof becomes economically unpreferable. Accordingly, the Ni content is defined to be from 0.10 to 2.00%.

Next, reasons for restricting the number ratio of oxide inclusions in the steel of the third aspect of the present invention will be described. Oxide inclusions outside the scope of the present invention, namely oxide inclusions other than $MgO \cdot Al_2O_3$ and MgO are present due to partly unavoidable mixing in the refining process of the steel. Making the amount of the unavoidably mixed oxide inclusions less than 20% in terms of the ratio of the number to the entire number of the oxide inclusions can stabilize the fine dispersion of the oxide inclusions to a high degree, inhibited the formation of the carbide structures and the white structures, and suppressed hardness reduction in the process of rolling fatigue. As a result, a significant extension of the life has been observed. For the reasons described above, the ratio of (the number of $MgO \cdot Al_2O_3$ +the number of MgO) to the number of the entire oxide inclusions is defined to be at least 0.8. In addition, the numbers of the oxide inclusions belonging to the respective groups have been quantitatively determined by electron microscopically observing a cross-section in the rolling direction, and obtaining the numbers per $mm^2$ of area.

In addition, there is no specific limitation on the method of producing the steels of the present invention. That is, a mother molten steel may be prepared either by a blast furnace-converter method or electric furnace method. Moreover, there is no limitation on the addition of the components to the mother molten steel. It is satisfactory to add metals containing respective addition components or the alloy of the metals to the mother molten steel. The addition may be conducted freely by any of methods such as addition by natural dropping, addition by blowing the addition components into the molten steel with an inert gas and addition by feeding an iron wire filled with an Mg source thereto. Furthermore, there is no limitation on the method of producing a steel ingot from a mother molten steel and rolling the ingot.

The present invention will be explained more in detail on the basis of examples.

EXAMPLES

Steel blooms having the chemical compositions shown in Tables 1 and 2 were produced by a blast furnace-converter-continuous casting method.

TABLE 1

| Classification | No. | C | Si | Mn | Cr | Mo | S | Al | N |
|---|---|---|---|---|---|---|---|---|---|
| Steel of invention | 1 | 0.99 | 0.26 | 0.35 | 1.45 | 0.43 | 0.005 | 0.025 | 0.006 |
| | 2 | 1.02 | 0.21 | 0.41 | 1.37 | 0.31 | 0.003 | 0.016 | 0.004 |
| | 3 | 0.97 | 0.25 | 0.47 | 1.38 | 0.73 | 0.004 | 0.031 | 0.005 |
| | 4 | 0.99 | 0.22 | 0.31 | 1.38 | 0.15 | 0.008 | 0.024 | 0.005 |
| | 5 | 1.04 | 0.24 | 0.36 | 1.41 | 1.12 | 0.005 | 0.027 | 0.006 |
| | 6 | 1.01 | 0.84 | 0.33 | 1.45 | 0.33 | 0.006 | 0.019 | 0.009 |
| | 7 | 0.98 | 1.42 | 0.35 | 1.51 | 0.48 | 0.004 | 0.030 | 0.005 |
| | 8 | 1.02 | 0.73 | 0.37 | 1.37 | 0.72 | 0.004 | 0.047 | 0.005 |
| | 9 | 0.96 | 0.26 | 0.37 | 1.42 | 0.51 | 0.005 | 0.031 | 0.006 |
| | 10 | 0.97 | 0.21 | 0.33 | 1.45 | 0.29 | 0.008 | 0.024 | 0.006 |
| | 11 | 0.97 | 0.24 | 0.35 | 1.44 | 0.17 | 0.005 | 0.026 | 0.007 |
| | 12 | 1.01 | 0.23 | 0.35 | 1.45 | 0.21 | 0.003 | 0.025 | 0.005 |
| Comp. steel | 13 | 1.00 | 0.24 | 0.36 | 1.38 | — | 0.006 | 0.026 | 0.005 |
| | 14 | 0.97 | 0.26 | 0.35 | 1.45 | 0.25 | 0.004 | 0.031 | 0.004 |
| | 15 | 0.99 | 0.41 | 0.37 | 1.37 | 0.21 | 0.006 | 0.025 | 0.006 |
| | 16 | 1.01 | 0.04 | 0.37 | 1.41 | 0.10 | 0.005 | 0.031 | 0.005 |
| | 17 | 1.01 | 0.25 | 0.35 | 1.43 | 0.01 | 0.004 | 0.025 | 0.005 |

TABLE 2

| Classification | No. | T.Mg | P | Ti | T.O | V | Nb | Ni | Note |
|---|---|---|---|---|---|---|---|---|---|
| Steel of invention | 1 | 0.0031 | 0.016 | 0.0013 | 0.0007 | — | — | — | |
| | 2 | 0.0010 | 0.012 | 0.0014 | 0.0008 | — | — | — | |
| | 3 | 0.0261 | 0.009 | 0.0016 | 0.0007 | — | — | — | |
| | 4 | 0.0030 | 0.013 | 0.0014 | 0.0004 | — | — | — | |
| | 5 | 0.0039 | 0.018 | 0.0015 | 0.0006 | — | — | — | |
| | 6 | 0.0027 | 0.015 | 0.0023 | 0.0007 | — | — | — | |
| | 7 | 0.0061 | 0.016 | 0.0009 | 0.0005 | — | — | — | |
| | 8 | 0.0010 | 0.014 | 0.0014 | 0.0006 | 0.24 | — | — | |
| | 9 | 0.0027 | 0.009 | 0.0015 | 0.0006 | — | 0.026 | — | |
| | 10 | 0.0030 | 0.017 | 0.0014 | 0.0007 | — | — | 1.03 | |
| | 11 | 0.0033 | 0.013 | 0.0015 | 0.0006 | 0.07 | — | 0.95 | |
| | 12 | 0.0046 | 0.014 | 0.0015 | 0.0007 | 0.13 | — | 0.54 | |
| Comp. steel | 13 | — | 0.013 | 0.0011 | 0.0006 | — | — | — | No Mg addition |
| | 14 | 0.0003 | 0.012 | 0.0014 | 0.0008 | — | — | — | Mg ≦ lower limit |
| | 15 | 0.0325 | 0.009 | 0.0015 | 0.0008 | — | — | — | Mg ≧ upper limit |
| | 16 | 0.0027 | 0.013 | 0.0015 | 0.0007 | — | — | — | Si ≦ lower limit |
| | 17 | 0.0035 | 0.015 | 0.0014 | 0.0009 | — | — | — | Mo ≦ lower limit |

A molten iron discharged from a blast furnace was dephosphorized and desulfurized, charged into a converter, and refined by oxygen blowing to obtain a mother molten steel having predetermined contents of C, P and S. Al, Si, Mn, Cr and Mo were added to the mother molten steel during the discharge thereof in a ladle and during RH treatment, and the molten steel was subjected to degassing and inclusion removal by RH treatment. MG alloy was added to the molten steel in the ladle subsequent to the RH treatment. There was employed at least one MG alloy selected from Si—MG alloys, Fe—Si—Mg alloys, Fe—Mn—MG alloys, Fe—Si—Mn—MG alloys (above-mentioned alloys each having a MG content of 0.5 to 30% by weight), and Al—MG alloys each having a MG content of 5 to 70% by weight. The MG alloys were added to the molten steel by feeding an iron wire filled with the granular Mg alloys thereto. A steel slab was prepared therefrom by continuous casting.

The steel slab was bloomed, and steel bar rolled to obtain a round steel bar having a diameter of 65 mm. As to the results of measuring the number ratios and the sizes of oxides on cross sections in the rolling direction of the steel bars thus obtained, the steels of the present invention were all found to be in the proper ranges as shown in Tables 3 and 4.

TABLE 3

| Classification | No. | Oxides Size (μm) | Oxides Number ratio | Mori's thrust type contact rolling fatigue test $L_{10}$ | Mori's thrust type contact rolling fatigue test Presence of white structure carbide structure |
|---|---|---|---|---|---|
| Steel of invention | 1 | 2–7 | 0.77 | 7.8 | No |
| | 2 | 3–7 | 0.72 | 7.5 | No |
| | 3 | 2–7 | 0.90 | 9.3 | No |
| | 4 | 2–7 | 0.75 | 6.7 | No |
| | 5 | 3–7 | 0.88 | 10.4 | No |
| | 6 | 2–7 | 0.76 | 8.3 | No |
| | 7 | 2–7 | 0.85 | 9.7 | No |
| | 8 | 3–8 | 0.71 | 9.0 | No |
| | 9 | 2–7 | 0.75 | 8.5 | No |
| | 10 | 3–7 | 0.75 | 9.4 | No |
| | 11 | 2–7 | 0.77 | 9.4 | No |
| | 12 | 2–7 | 0.87 | 10.0 | No |
| Comp. steel | 13 | 5–20 | 0 | 1 | Yes |
| | 14 | 5–15 | 0.54 | 3.3 | Yes |
| | 15 | 4–15 | 0.90 | 4.0 | Yes |
| | 16 | 2–7 | 0.75 | 3.1 | Yes |
| | 17 | 2–7 | 0.80 | 4.7 | Yes |

TABLE 4

| Classification | No. | Point contact rolling fatigue test $L_{10}$ | Point contact rolling fatigue test Presence of white structure carbide structure | Note |
|---|---|---|---|---|
| Steel of invention | 1 | 10.6 | No | First aspect of invention |
| | 2 | 9.1 | No | First aspect of invention |
| | 3 | 14.0 | No | Third aspect of invention |
| | 4 | 8.5 | No | First aspect of invention |
| | 5 | 16.2 | No | Third aspect of invention |
| | 6 | 11.4 | No | First aspect of invention |
| | 7 | 15.8 | No | Third aspect of invention |
| | 8 | 12.2 | No | Second aspect of invention |
| | 9 | 11.7 | No | Second aspect of invention |
| | 10 | 13.5 | No | Second aspect of invention |
| | 11 | 13.7 | No | Second aspect of invention |
| | 12 | 15.9 | No | Third aspect of invention |
| Comp. steel | 13 | 1 | Yes | |
| | 14 | 3.8 | Yes | |
| | 15 | 4.7 | Yes | |
| | 16 | 4.3 | Yes | |
| | 17 | 5.4 | Yes | |

Note:
1) The size of oxides designates equivalent spherical diameters present per $mm^2$ of an area.
2) The number ratio of oxides: (number of $MgO \cdot Al_2O_3$ + number of MgO)/number of the entire oxide inclusions, provided that the numbers are based on $mm^2$.
3) $L_{10}$: a relative value on the basis of $L_{10}$ which is defined to be 1 in Comparative Example 13.

The steel materials of the present invention were spheroidized to give rolling fatigue test pieces, which were quenched and tempered under the conditions of heating at 840° C., quenching and tempering at 160° C. The test pieces were subjected to rolling fatigue test by a Mori's thrust type contact rolling fatigue testor (Hertzian maximum contact stress of 540 $kgf/mm^2$) and a point contact type contact rolling fatigue testor (cylindrical rolling fatigue test pieces, Hertzian maximum contact stress of 600 $kgf/mm^2$) to evaluate the rolling fatigue characteristics. As a measure of the fatigue life, the $L_{10}$ life was employed, namely the number of stress cycles until the fatigue failure took place at a cumulative failure probability of 10% obtained by plotting the test results on Weibull probability paper. Tables 3 and 4 show the relative values of the $L_{10}$ lives of the steels based on the $L_{10}$ life, which was defined to be 1, in Comparative Example 13. Nos 1, 2, 4 and 6 were examples in the first aspect of the present invention. Nos 8, 9, 10 and 11 were examples in the second aspect of the present invention. In these examples, the steels exhibited good fatigue characteristics compared with the steel in Comparative Example 13. Moreover, Nos 3, 5, 7 and 12 were examples in the third aspect of the present invention wherein the number ratios of MgO type oxides were at least 0.8. The steels in the examples exhibited further good fatigue characteristics compared with No. 1 and others in the first aspect of the present invention and No. 8 and others in the second aspect of present invention.

Furthermore, the presence of the white structures and the carbide structures was examined on the test pieces subsequent to $10^8$ cycles of a rolling fatigue test, and the results thus obtained are additionally shown in Tables 3 and 4. The formation of the white structures and carbide structures was inhibited in the steels of the present invention. On the other hand, the contents of Mo and Mg in Comparative Example No. 13 were lower than the content ranges of the present invention. The contents of Mg, Si and Mo in Comparative Example No. 14, 16 and 17 were lower than the content ranges of the present invention. The content of Mg in Comparative Example 15 was higher than the content range of the present invention. All the test pieces in Comparative Examples mentioned above each exhibited a fatigue life of less than six times as much as that of Comparative Example 13. The formation of the white structures and the carbide structures was observed on all test pieces in the Comparative Examples.

As described above, the present invention can realize the formation of fine oxide inclusions, the inhibition of forming white structures and carbide structures and the prevention of hardness reduction. As a result, it has become possible to provide a bearing steel which may greatly improve, in bearing parts, the rolling fatigue life under a high load. Accordingly, the effects of the present invention in industry are extremely significant.

We claim:

1. A high carbon bearing steel having a long life which comprises, in terms of weight, 0.70 to 1.20% of C, 0.15 to 1.70% of Si, 0.15 to 1.20% of Mn, 0.50 to 2.00% of Cr, 0.05 to 1.50% of Mo, 0.001 to 0.03% of S, 0.010 to 0.05% of Al, 0.003 to 0.015% of N, 0.0005 to 0.0300% of total Mg, up to 0.025% of P, up to 0.0040% of Ti, up to 0.0015% of total oxygen and the balance Fe and unavoidable impurities.

2. A high carbon bearing steel having a long life which comprises, in terms of weight, 0.70 to 1.20% of C, 0.15 to 1.70% of Si, 0.15 to 1.20% of Mn, 0.50 to 2.00% of Cr, 0.05 to 1.50% of Mo, 0.001 to 0.03% of S, 0.010 to 0.05% of Al, 0.003 to 0.015% of N, 0.0005 to 0.0300% of total Mg, one or at least two elements selected from the group consisting of the following elements in the following amounts: 0.03 to 0.7% of V, 0.005 to 0.3% of Nb and 0.10 to 2.00% of Ni, up to 0.025% of P, up to 0.0040% of Ti, up to 0.0015% of total oxygen and the balance Fe and unavoidable impurities.

3. The high carbon bearing steel having a long life according to claim 1, wherein the number ratio of oxides contained therein satisfies the formula $$(\text{number of MgO.Al}_2\text{O}_3 + \text{number of MgO})/(\text{number of total oxide inclusions}) \geq 0.80.$$

4. The high carbon bearing steel having a long life according according to claim 2 wherein the number ratio of oxides contained therein satisfies the formula $$(\text{number of MgO.Al}_2\text{O}_3 + \text{number of MgO})/(\text{number of total oxide inclusions}) \geq 0.80.$$

* * * * *